(12) United States Patent
Constantinescu

(10) Patent No.: US 7,366,952 B2
(45) Date of Patent: Apr. 29, 2008

(54) INTERCONNECT CONDITION DETECTION USING TEST PATTERN IN IDLE PACKETS

(75) Inventor: Cristian N. Constantinescu, Beaverton, OR (US)

(73) Assignee: Intel Corporation, Santa Clara, CA (US)

(*) Notice: Subject to any disclaimer, the term of this patent is extended or adjusted under 35 U.S.C. 154(b) by 877 days.

(21) Appl. No.: 10/463,086

(22) Filed: Jun. 16, 2003

(65) Prior Publication Data

US 2004/0252644 A1 Dec. 16, 2004

(51) Int. Cl.
*G06F 11/00* (2006.01)
(52) U.S. Cl. ......................................... 714/33; 370/249
(58) Field of Classification Search ................... 714/33, 714/37, 43, 56, 18, 48
See application file for complete search history.

(56) References Cited

U.S. PATENT DOCUMENTS

| 5,819,025 | A | * | 10/1998 | Williams ..................... 714/30 |
| 6,000,051 | A | * | 12/1999 | Nadeau-Dostie et al. ... 714/727 |
| 6,505,317 | B1 | * | 1/2003 | Smith et al. ................ 714/738 |
| 6,625,764 | B1 | * | 9/2003 | Dawson ....................... 714/715 |
| 6,643,810 | B2 | * | 11/2003 | Whetsel ...................... 714/724 |
| 6,782,503 | B1 | * | 8/2004 | Dawson ....................... 714/739 |
| 7,073,111 | B2 | * | 7/2006 | Whetsel ...................... 714/727 |
| 2003/0229835 | A1 | * | 12/2003 | Whetsel ...................... 714/727 |
| 2004/0128595 | A1 | * | 7/2004 | Schoenborn et al. ........ 714/724 |

OTHER PUBLICATIONS

A. W. Berger, A.E. Eckberg, Ting-Chao Hou, D.M. Lucantoni; Performance Characterizations of Traffic Monitoring, and Associated Control, Mechanisms for Broadband "Packet" Networks; 400B.2.1-400B.2.5; 1990 IEEE.

Guy Castagnoli, Stefan Brauer, and Martin Herrmann; Optimization of Cyclic Redundancy—Check Codes with 24 and 32 Parity Bits; IEEE Transactions on Communications, vol. 41, No. 6, Jun. 1993, pp. 883-892.

Ting-Ting Y. Lin, Daniel P. Siewiorek; Error Log Analysis: Statistical Modeling and Heuristic Trend Analysis; IEEE Transactions on Reliability, vol. 39, No. 4, Oct. 1990, pp. 419-432.

* cited by examiner

*Primary Examiner*—Nadeem Iqbal
(74) *Attorney, Agent, or Firm*—Robert D. Anderson

(57) ABSTRACT

In some embodiments, a receiver can receive from an interconnect information packets and idle packets, where one or more of the idle packets includes a test pattern. A condition detector can detect a condition of the interconnect in response to the test pattern. Other embodiments are described and claimed.

25 Claims, 7 Drawing Sheets

INTERCONNECT CONDITION DETECTION USING TEST PATTERN IN IDLE PACKETS

TECHNICAL FIELD

The inventions generally relate to detection and/or prediction of a condition of an interconnect.

BACKGROUND

Research shows that many computer failures are preceded by bursts of errors induced by intermittent faults, as described, for example in "Error Log Analysis: Statistical Modeling and Heuristic Trend Analysis" by T. Y. Lin and D. P. Siewiorek, IEEE Transactions on Reliability, Vol. 39, No. 4, 1990, pp. 419-432. Early detection of failure prone interconnects significantly improves availability of systems employing those interconnects (for example, in computing systems). Isolation of a failing interconnect before a crash occurs can allow for seamless activation of spare interconnects or for graceful degradation in cases where spare interconnects are not available.

Some failure prediction mechanisms rely on the detection and counting of errors which occur while control and/or data packets are transferred over the interconnect. A problem with this type of approach is that unrecoverable errors detected within control and/or data packets commonly lead to system failure.

Some failure prediction mechanisms test interconnects off-line prior to inclusion of the interconnect in a system. A test pattern is sent and detection and counting of errors is performed prior to use of the interconnect in the system. Problems that occur with this type of failure prediction mechanism include situations where the interconnect degrades over time or quickly degrades while the interconnect is working within the system. Since the testing is done offline prior to inclusion of the interconnect in the system the degradation would not be identified during ongoing use of the interconnect in the system.

BRIEF DESCRIPTION OF THE DRAWINGS

The inventions will be understood more fully from the detailed description given below and from the accompanying drawings of some embodiments of the inventions which, however, should not be taken to limit the inventions to the specific embodiments described, but are for explanation and understanding only.

DETAILED DESCRIPTION

Some embodiments of the inventions relate to interconnect failure detection and/or prediction devices. Interconnects can be anything that can connect two or more things together that carry signals, such as any device, apparatus, component, element, or anything else. In some embodiments interconnects transmit information packets between different components. Information packets can include control packets, data packets, a mixture of control and data packets, address packets, address packets combined with some other type of packets, and/or other types of packets or combinations of packets. Interconnects also can transmit idle packets during which no information packets are being transmitted. According to some embodiments a test pattern is transferred via the interconnect as part of the idle packets. In some embodiments a test pattern is transferred via the interconnect where the test pattern is a stress test pattern that purposely stresses the interconnect more than common data stresses the interconnect.

Figure 7:
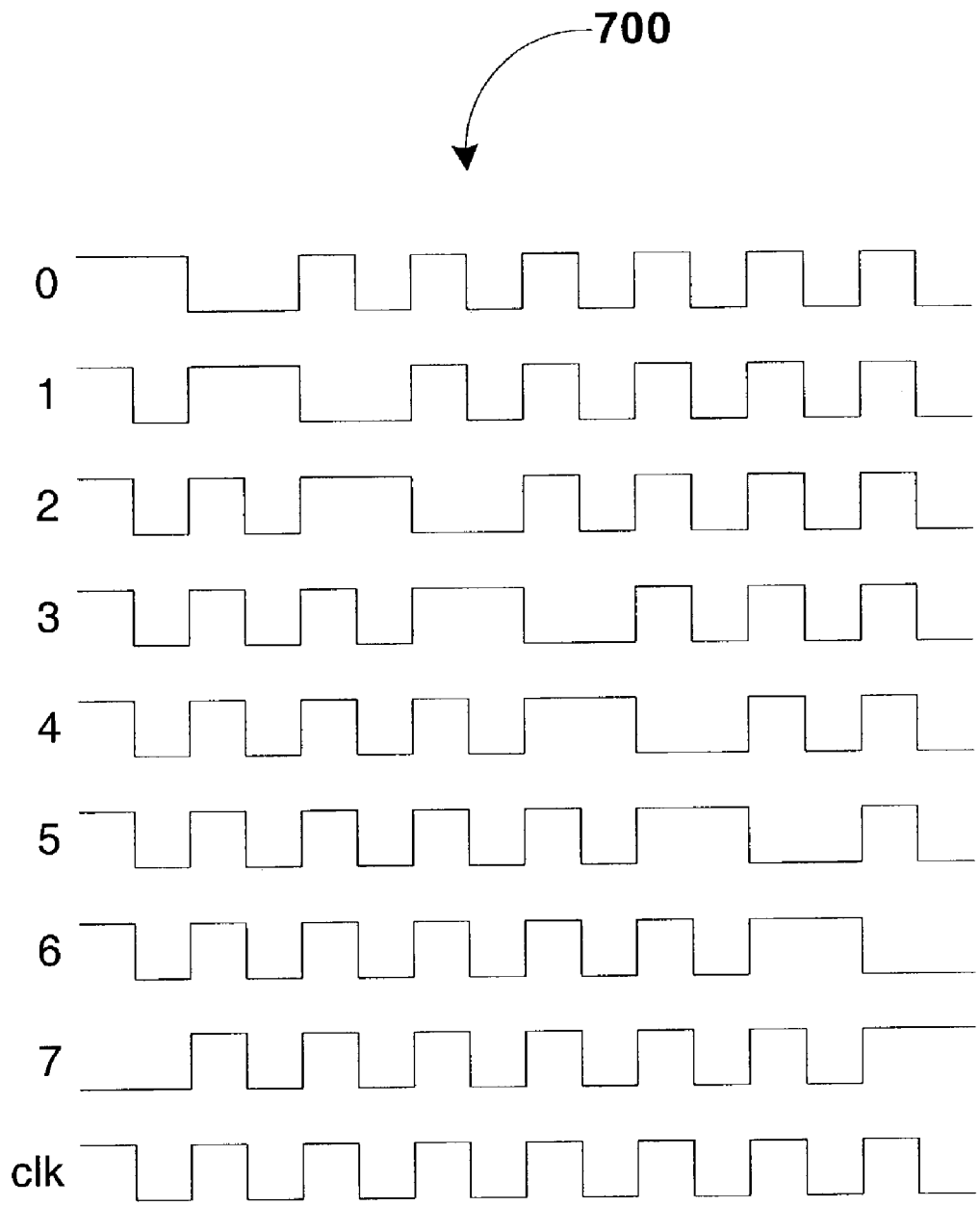
FIG. 7 is a waveform representation of a test pattern signal according to some embodiments of the inventions.

A test pattern transferred as part of the idle packets may be included in at least one of the idle packets, and can be distributed in portions throughout several of the idle packets. The test pattern may be a test stress pattern selected to stress the interconnect more than regular information such as data and/or control stresses the interconnect (for instance using a walking one pattern, as shown in FIG. 7). The increased stressing of the interconnect allows for early activation of any intermittent faults of the interconnect transmission and a resulting detection of failure prone interconnects. Errors induced by a test stress pattern would have been unrecoverable in a case of relying on detection and counting of errors occurring while information packets such as control and/or data packets are transmitted. However, according to some embodiments, errors are induced by a test stress pattern transmitted during the idle packets in a manner that does not produce a system crash, since the idle packets may be safely discarded after error detection and logging. In some embodiments system availability may be increased using a failure prediction approach such as the approach outlined above, for example.

Some embodiments relate to serial interconnects that transfer information packets and/or idle packets. Some embodiments relate to parallel interconnects that transfer information packets and/or idle packets. Some embodiments relate to interconnects other than serial or parallel interconnects that transfer information packets and/or idle packets.

Figure 1:
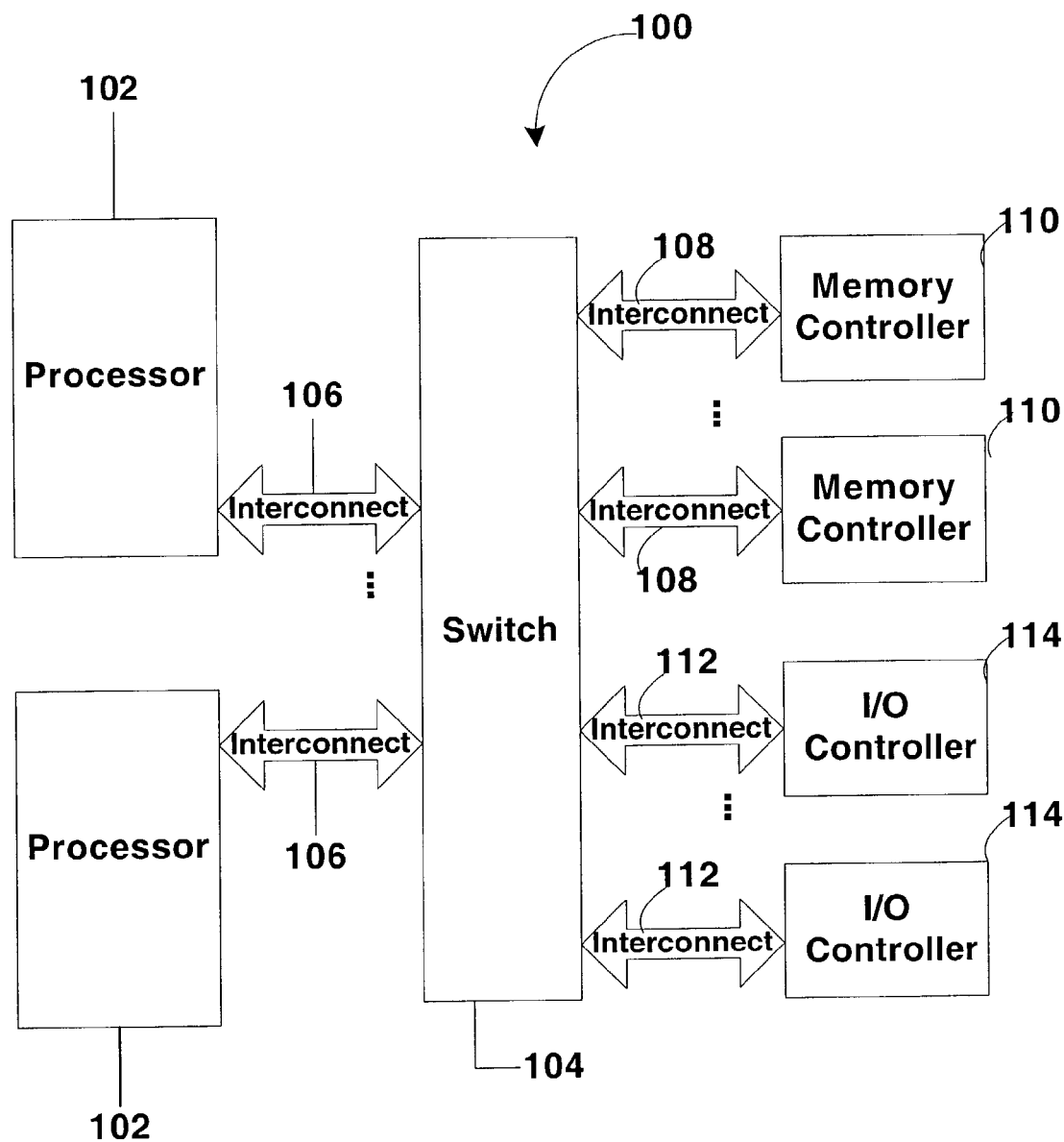
FIG. 1 is a block diagram representation of a computing system in which some embodiments of the inventions may be implemented.

FIG. 1 illustrates a block diagram of a computing system 100 in which some embodiments may be implemented. In computing system 100 one or more processors 102 are coupled to a switch 104 by one or more interconnects 106. Each of the interconnects 106 corresponds to a respective coupled processor 102. The dots between interconnects 106 are included to show that any number of processors 102 and corresponding interconnects 106 may be used in computing systems in which some embodiments are implemented.

Interconnects 108 couple the switch 104 to one or more memory controllers 110. Each of the interconnects 108 corresponds to a respective coupled memory controller 110. The dots between interconnects 108 are included to show that any number of memory controllers 110 and corresponding interconnects 108 may be used in computing systems in which some embodiments are implemented.

Interconnects 112 couple the switch 104 to one or more input/output controllers 114 (I/O controllers 114). Each of the interconnects 112 corresponds to a respective coupled I/O controller 114. The dots between interconnects 112 are included to show that any number of I/O controllers 114 and corresponding interconnects 112 may be used in computing systems in which some embodiments are implemented.

In some embodiments interconnects 106, 108 and/or 112 illustrated in FIG. 1 may be parallel interconnects. In some embodiments interconnects 106, 108 and/or 112 illustrated in FIG. 1 may be serial interconnects. In some embodiments interconnects 106, 108 and/or 112 illustrated in FIG. 1 may be other types of interconnects than serial interconnects or parallel interconnects, and each of the interconnects need not be the same type of interconnect as any of the other interconnects. In some embodiments interconnects 106, 108 and/or 112 illustrated in FIG. 1 may transfer information packets and/or idle packets. In some embodiments switch 104 may be a chip set or may be included within a chip set.

Figure 2:
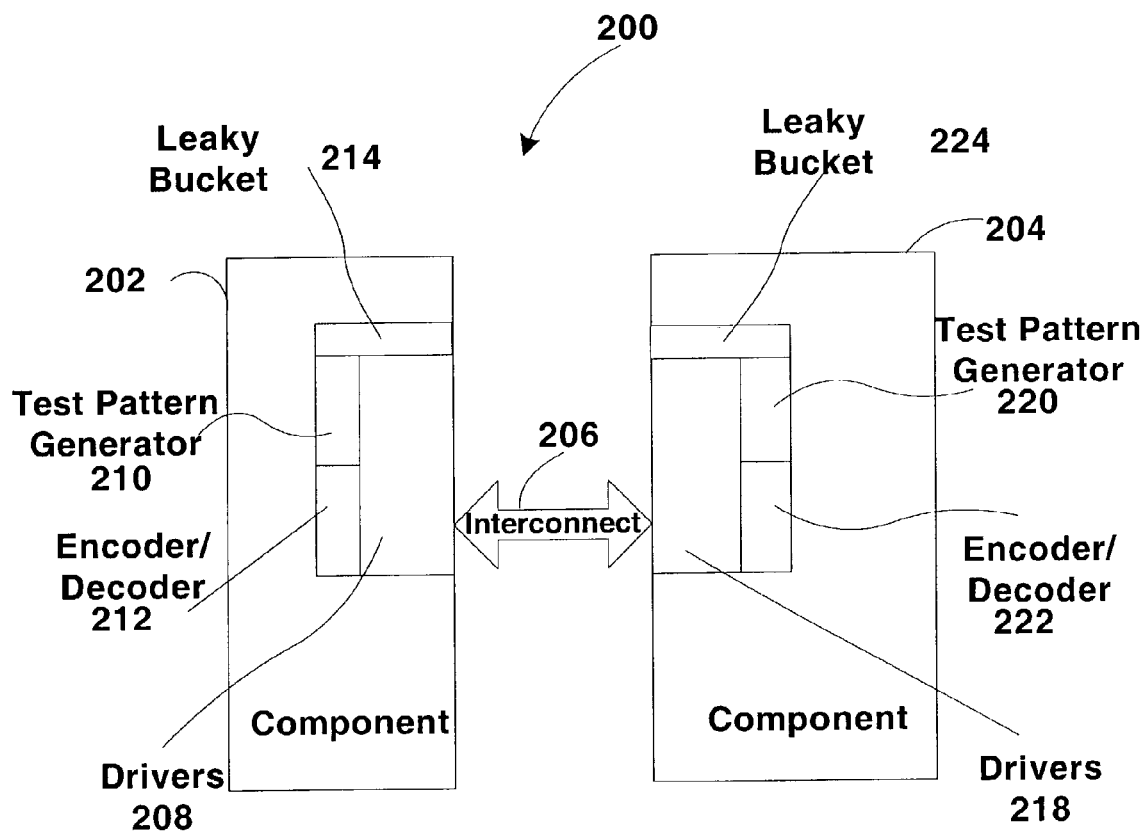
FIG. 2 is a block diagram representation of a computing system according to some embodiments of the inventions.

FIG. 2 illustrates a block diagram of a computing system 200 according to some embodiments. A first component 202 and a second component 204 are each coupled to an interconnect 206. First component 202 and second component 204 may each be a processor, a switch, a chip set or a portion of a chip set, a memory controller, an I/O controller, or some other type of component, and each of the components may be the same type of component or different types of components than each other. Interconnect 206 may be a serial interconnect, a parallel interconnect, or some other type of interconnect.

Component 202 includes drivers 208, test pattern generator 210, encoder/decoder 212, and leaky bucket 214. Drivers 208 could include drivers using GTL (Gunning Transistor Logic), differential signaling drivers, and/or differential signaling drivers such as Low Voltage Differential Signaling Drivers (LVDs), for example. Test pattern generator 210 produces a test pattern which may be included in idle packets transmitted by component 202 via interconnect 206. According to some embodiments the test pattern produced by test pattern generator 210 may be a stress pattern selected to stress the interconnect more than regular information such as data and/or control transmitted via the interconnect. Encoding/decoding may be performed by encoder/decoder 212 using, for example, either cyclical redundancy check (CRC) or error correcting codes (ECC). Alternatively or in addition to CRC and/or ECC, errors within the idle packet may also be detected by checking the received packet against a known stress pattern.

Leaky bucket 214 compares the error rate of the interconnect against a predetermined error rate that is considered acceptable for normal operating conditions. This is typically achieved using an up/down counter. The counter is incremented when the interconnect experiences an error and decremented at a predefined rate (for example, the acceptable error rate). A failure is considered eminent when the number stored in the counter reaches a predetermined threshold at which the bucket is full.

Several leaky bucket implementations have been described and/or implemented. See, for example, "Performance Characteristics of Traffic Monitoring, and Associated Control, Mechanisms for Broadband Packet Networks" by A. W. Berger et al., IEEE Global Telecommunications Conference, Vol. 1, 1990, pp. 350-354. Some embodiments could include the leaky bucket described in this reference or any other leaky bucket implementation. The leaky buckets described and/or illustrated herein including but not limited to leaky buckets 214 and 224 could be implemented according to the leaky bucket described in this reference or any other leaky bucket implementation.

Component 204 includes drivers 218, test pattern generator 220, encoder/decoder 222, and leaky bucket 224, which have the capability of performing similar functions as drivers 208, stress pattern generator 210, encoder/decoder 212, and leaky bucket 214, respectively. The drivers 208 and 218, test pattern generators 210 and 220, encoder/decoders 212 and 222, and leaky buckets 214 and 224 included within the components 202 and 204 respectively also both have receiver side capabilities such as receiving information packets such as control packets and/or data packets, receiving a test pattern which may be included in idle packets transmitted by another component via interconnect 206, etc. The drivers 208 and 218, test pattern generators 210 and 220, encoder/decoders 212 and 222, and leaky buckets 214 and 224 included within the components 202 and 204 respectively may also be used to perform receiver side functions associated with decoding packets, detecting errors within the idle packet by checking the received packet against a known stress pattern, etc. In some embodiments the receiver side capabilities and transmitter side capabilities could be included in the same components. In some embodiments a component could include only transmitter capabilities or only receiver capabilities.

Figure 3:
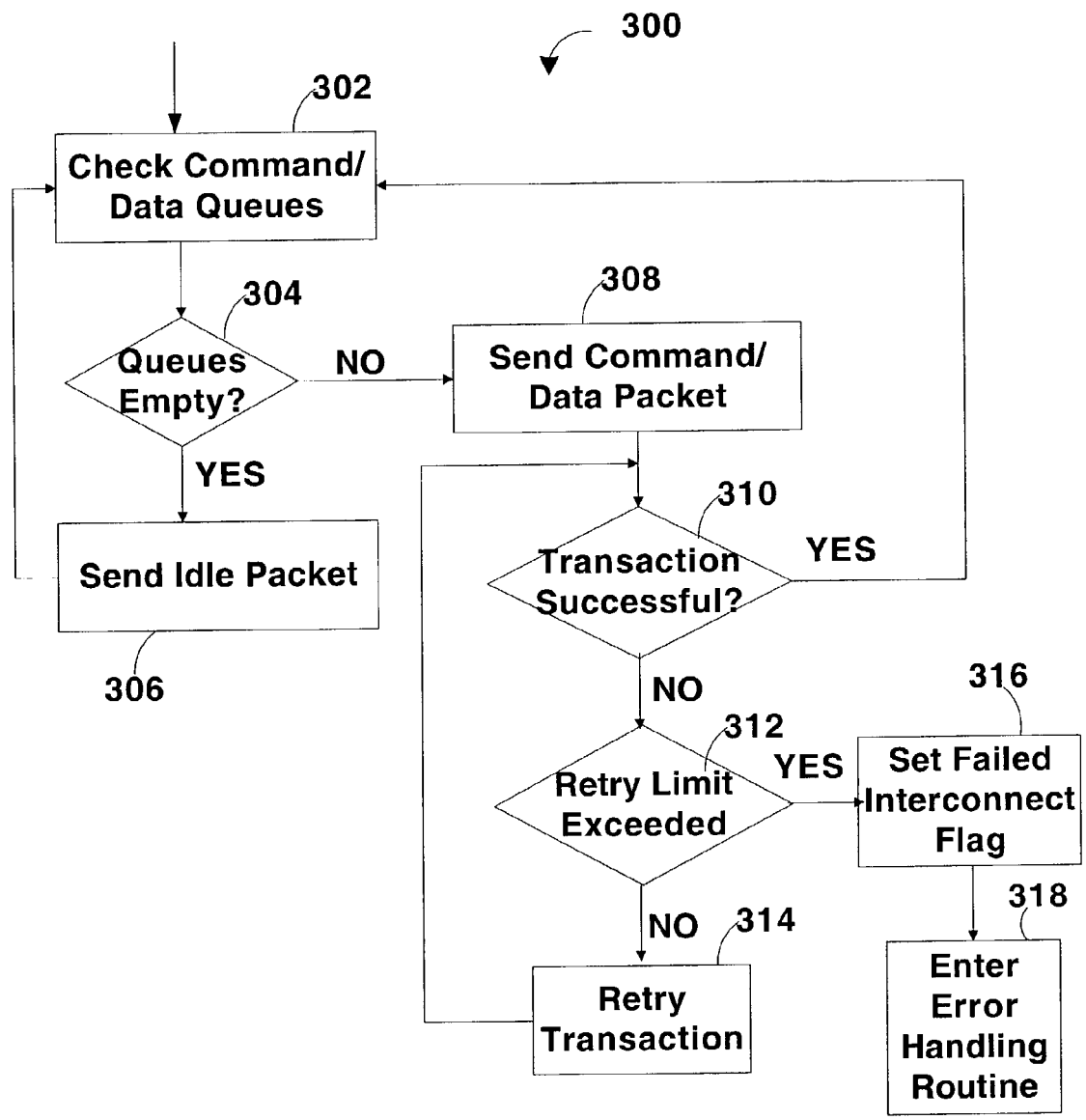
FIG. 3 is a flow diagram of operation of some embodiments of the inventions.

FIG. 3 illustrates a flow diagram 300 representing signaling one or more interconnect failures at a transmitter. The flow illustrated in FIG. 3 according to some embodiments may be implemented using, for example, a component such as any of those illustrated in other drawings herein (for example by any of the processors 102, switch 104, memory controllers 110 or I/O controllers 114 illustrated in FIG. 1 or any of the components 202 and 204 illustrated in FIG. 2 or by any other components illustrated herein in later FIGs, for example). However, the embodiments illustrated in FIG. 3 need not be limited to being performed by such components and need not perform exactly the same flow as illustrated in FIG. 3. Many variations of the flow illustrated in FIG. 3 may be implemented according to some embodiments.

According to some embodiments, in the flow 300 illustrated in FIG. 3 the information queues such as command and/or data queues are checked for the presence of pending read/write transactions at 302. If queues are empty at 304 (indicating an absence of pending read/write transactions) an idle packet is generated at 306. In some embodiments the idle packet generation of 306 may be performed, for example, by a test pattern generator such as test pattern generator 210 of component 202 in FIG. 2 or test pattern generator 220 of component 204 in FIG. 2. However, the idle packet generation of 306 is not limited to being performed by a component and/or a test pattern generator, or by a particular component and/or test generator as illustrated in any of the FIGs herein. Part of the sending of the idle packet in 306 can include a test pattern or a portion of a test pattern in the idle packet, appending parity bits within the idle packet, or some other way of adding, subtracting, or changing an idle packet. If the queues are not empty at 304 (indicating a presence of pending read/write transactions) an information packet such as a command and/or data packet is sent at 308. This sending of the information packet at 308 is performed if at least one of the transmitter queues is not empty.

Information, command, data and idle packets as described herein and according to some embodiments can each include check bits computed with the aid of a CRC generator polynomial. A process of encoding and/or decoding a packet has been previously described (see, for example, "Optimization of Cyclic Redundancy-Check Codes with 24 and 32 Parity Bits" by G. Castagnoli, S. Brauer and M. Herrmann, IEEE transactions on Communications, Vol. 41, No. 6, 1993, pp. 883-892). This or any other implementation of encoding and/or decoding a packet may be implemented in accordance with some embodiments.

Figure 4:
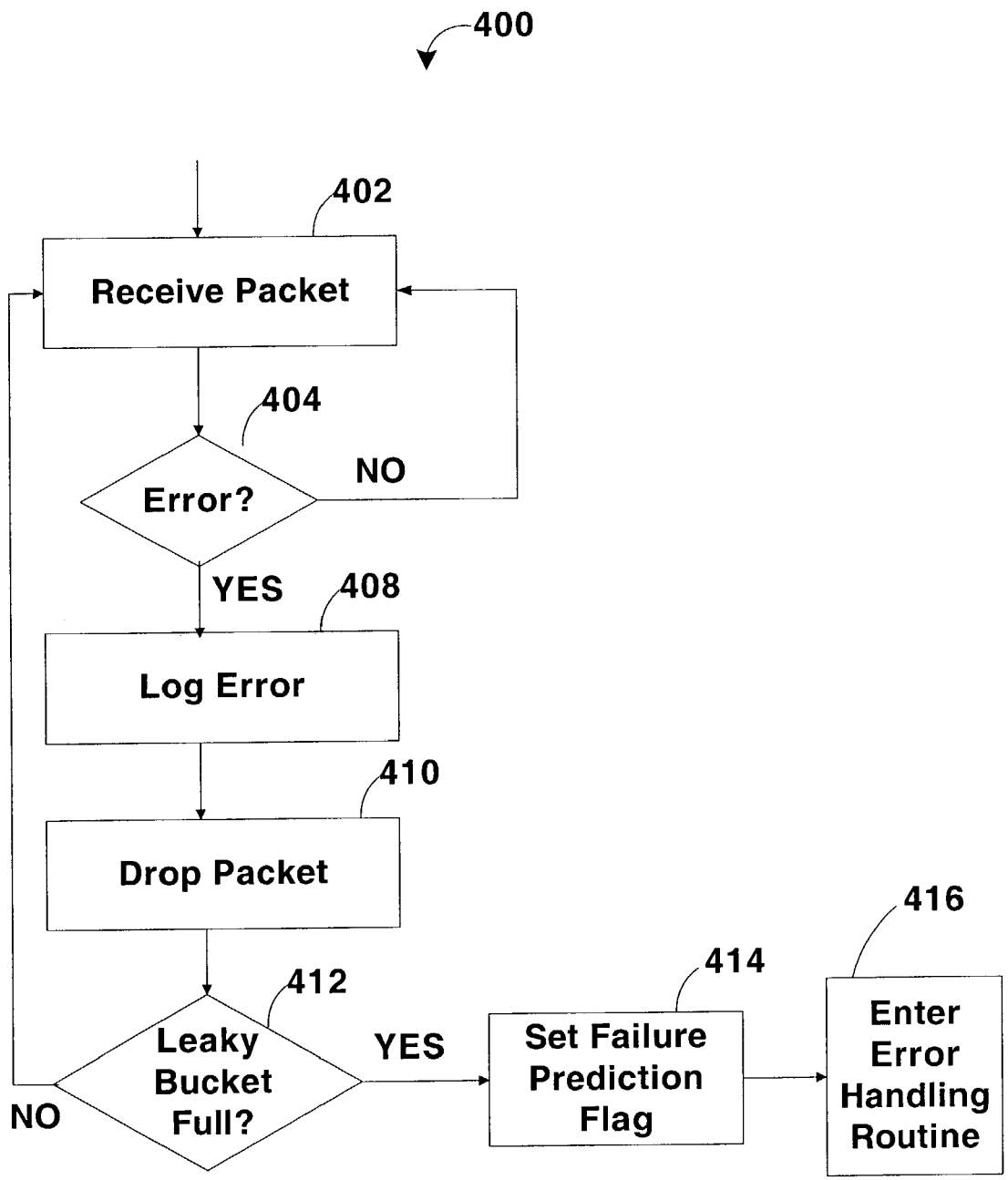
FIG. 4 is a flow diagram of operation of some embodiments of the inventions.

After the information packet is sent at 308 a decision is made at 310 to determine if a transaction has successfully completed. Successful completion of a transaction may be confirmed, for example, by the return of data (such as in the case of read commands) or an acknowledge message (such as in the case of write commands). If a successful transaction has completed as determined at 310 flow can then return, for example, to check information queues at 302. However, if a successful transaction has not completed as determined at 310, failed transactions may be retried, for a predefined number of times at 312 and 314. If a retry limit is exceeded at 312 a failed interconnect flag may be set at 316. If the retry limit is not exceeded at 312 the transaction may be retried at 314, after which a determination may be made at 310 again to see if the retried transaction is successful. After a failed interconnect flag is set at 316 when the retry limit is exceeded at 312, an error handling routine may be entered at 318. After error handling, control can be transferred to the system's Operating System (OS). The error handling routine entered at 318 attempts confinement of the errors induced by the failure. In this case the application or applications that initiated the uncompleted transaction or transactions have to be terminated. If the operating system is affected by the interconnect failure a system crash occurs. FIG. 4 illustrates a flow diagram 400 representing error detection and failure prediction at a receiver. This can help signal an interconnect failure and lead to avoidance of a crashed system, for example. The flow illustrated in FIG. 4 according to some embodiments may be implemented using, for example, a component such as any of those illustrated in other drawings herein (for example by any of the processors 102, switch 104, memory controllers 110 or I/O controllers 114 illustrated in FIG. 1 or any of the components 202 and 204 illustrated in FIG. 2 or by any other components illustrated herein in later FIGS.). However, the embodiments illustrated in FIG. 4 need not be limited to being performed by such components and need not perform exactly the same flow as illustrated in FIG. 4. Many variations of the flow illustrated in FIG. 4 may be implemented according to some embodiments. An example of where error detection and failure prediction of an interconnect failure may be implemented is in some embodiments using CRC.

According to some embodiments the flow 400 in FIG. 4 illustrates error detection and failure prediction at a receiver. A packet such as an information packet and/or idle packet is received at 402. A determination is made at 404 as to whether an error has occurred. This error determination may be implemented, for example, using CRC or ECC. Alternatively or in addition to CRC and/or ECC, errors within the idle packet may also be detected by checking the received packet against a known stress pattern. According to some embodiments error detection 404 may be implemented using a decoder or an encoder/decoder (or decoder portion of an encoder/decoder) such as encoder/decoder 212 of component 202 illustrated in FIG. 2 or such as encoder/decoder 222 of component 204 illustrated in FIG. 2 or some other encoder/decoder or other method of error detection. Error detection 404 may be implemented using any decoder or portion thereof, any encoder/decoder or portion thereof, or some other device or portion of devices other than a decoder or an encoder/decoder and is not limited to any decoder or encoder/decoder described herein or to any other decoder or encoder/decoder.

If no error has been identified at 404 to indicate that the packet is error free then normal operation continues, for example by returning flow to receiving a packet at 402. For example, as a result of continued operation flow might loop back up to an input of packet receipt at 402. Continuation of normal operation can include, for example, returning requested data (as in the case of read commands) or an acknowledgement (as at the end of a successfully completed write command).

If an error is detected at 404 then an error may be logged at 408 and/or the erroneous packet may be dropped at 410. A determination may be made at 412 to determine if a leaky bucket if full, for example. The leaky bucket operation at 412 can predict a failure, for example, if a predetermined number of errors have been accumulated over a given period of time. Determination 412 may be performed using a leaky bucket implementation. In some embodiments determination 412 may predict a failure using some other arrangement than a leaky bucket implemenation. Some embodiments using a leaky bucket are implementation independent and may be performed using a leaky bucket such as leaky bucket 214 of component 202 illustrated in FIG. 2 or such as leaky bucket 224 of component 204 illustrated in FIG. 2. However, failure determination 412 may be performed using any leaky bucket implementation, any failure prediction implementation, or some other implementation or device other than a leaky bucket or failure prediction implementation, and is not limited to any leaky bucket described herein or to any other leaky bucket implementation or failure prediction implementation.

If a failure is determined at 412 then a failure prediction flag is set at 414, for example, if a predefined number of errors are accumulated over a given period of time. After the failure prediction flag is set at 414 an error handling routine 416 may be used to start a process of isolating the interconnect. The interconnect may be isolated, for example, by notifying the operating system, activating a spare interconnect if one is available or finding a degraded configuration, querying the traffic over the interconnect, and/or disabling the drivers. The isolation process may be platform, firmware and operating system specific for a variety of different embodiments. Once the error handling routine 416 has finished control may be transferred to the operating system, for example.

According to some embodiments, failure prediction at the receiver (for example such as failure prediction flag setting 414 in FIG. 4) can avoid signaling of the interconnect failures at the transmitter (for example such as setting failed interconnect flag at 316 of FIG. 3). This is because the stress pattern activates intermittent faults while idle packets rather than information packets such as data and/or command packets are transferred over the interconnect. In the case of failure prediction, no applications are terminated and a system crash due to interconnect failure can be avoided.

Figure 5:
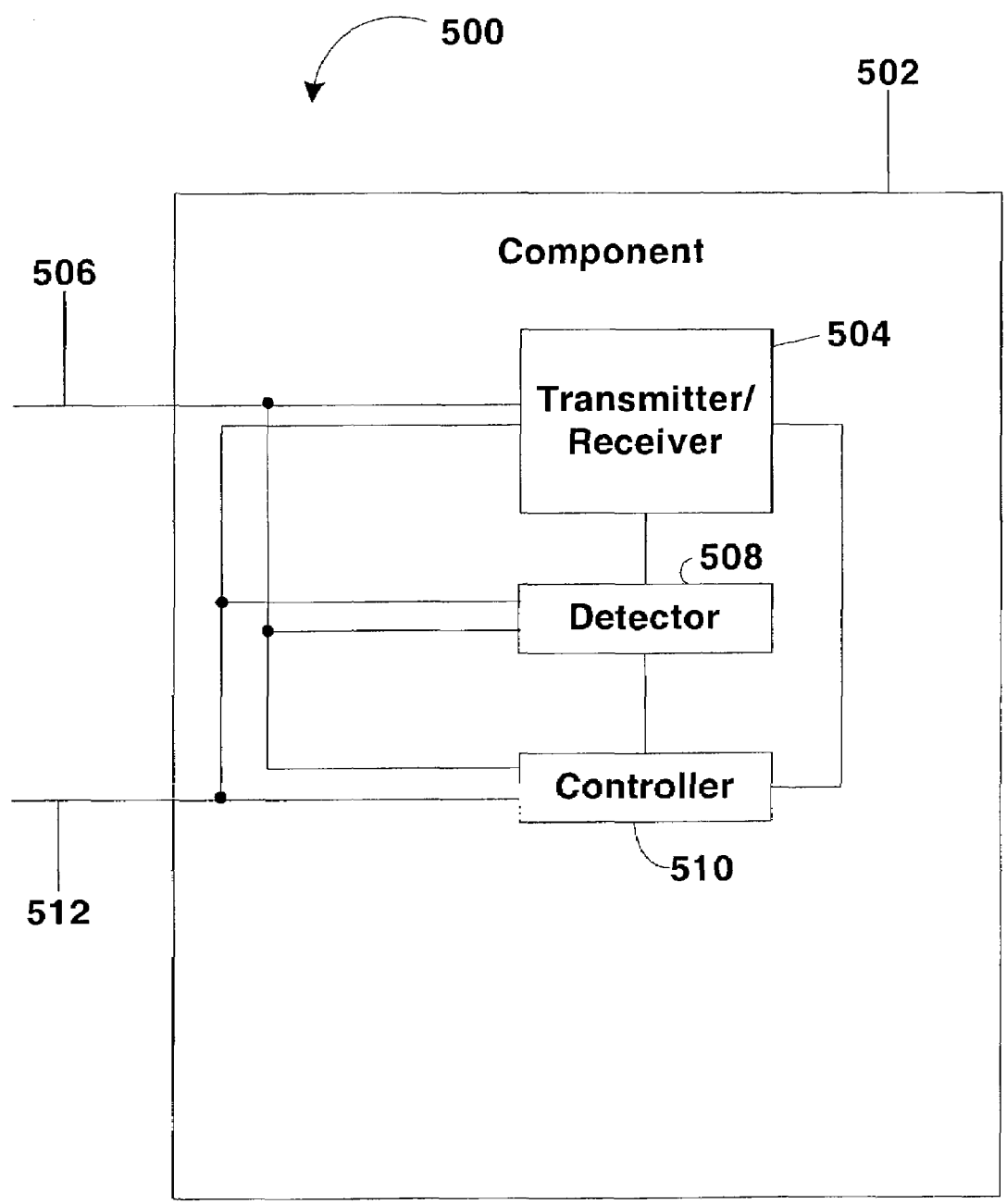
FIG. 5 is a block diagram representation according to some embodiments of the inventions.

FIG. 5 illustrates a block diagram of a device 500 according to some embodiments. Device 500 can be included in a computer system or some other type of system, and can include a component 502 such as, for example, a processor, switch, memory controller, chip set or portion of a chip set, I/O controller, or some other type of component. Component 502 includes a receiver and/or transmitter/receiver 504 that can receive from an interconnect 506 information packets and idle packets, where at least one of the idle packets includes a test pattern or a portion of a test pattern. The interconnect 506 can be a parallel interconnect, a serial interconnect, or some other type of interconnect.

In some embodiments the test pattern can be a stress pattern designed to stress the interconnect 506 more than a stress on the interconnect due to transmission of the information packets over the interconnect. In some embodiments the test pattern may be distributed throughout several idle packets.

Component 502 also includes a detector 508 that can detect a condition of the interconnect such as a failure condition of the interconnect in response to the test pattern. In some embodiments the detector 508 can detect and count errors that occur in response to the test pattern and can detect the condition of the interconnect when a number of the counted errors is greater than a predetermined number. In some embodiments the detector 508 compares the test pattern to a predetermined test pattern.

In some embodiments component 502 can also include a controller 510 that can activate a spare interconnect 512 in response to the condition detected by detector 508. The controller can, for example, replace interconnect 506 with spare interconnect 510 by connecting spare interconnect 512 to receiver 504 and disconnecting interconnect 506 from receiver 504.

Figure 6:
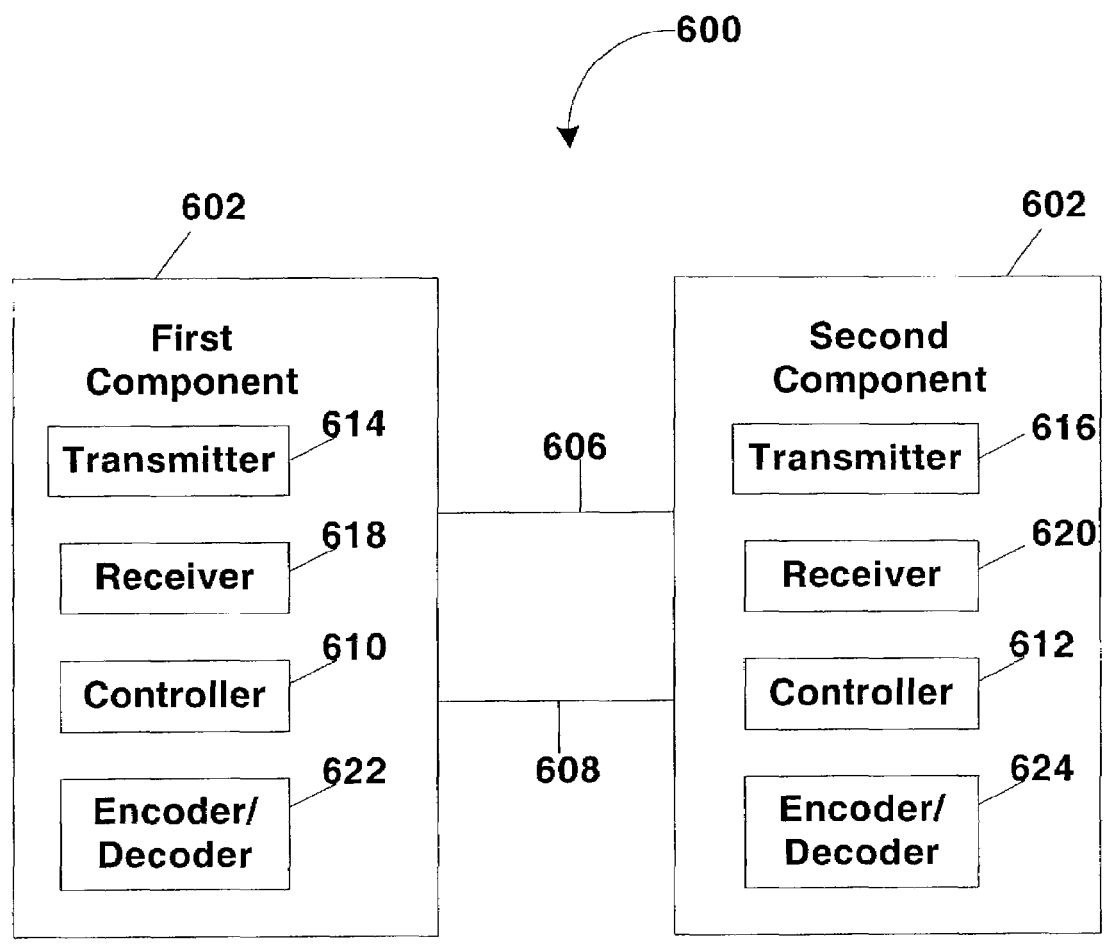
FIG. 6 is a block diagram representation according to some embodiments of the inventions.

FIG. 6 illustrates a block diagram of a system 600 according to some embodiments. System 600 includes a first component 602, a second component 604 and an interconnect 606. System 600 can be a computer system or some other type of system. First component 602 and second component 604 can each be, for example, a processor, a switch, a memory controller, a chip set, a portion of a chip set, an I/O controller, or some other type of component, and do not have to be the same type of component. For example, first component 602 can be a processor and second component 604 could be a chip set or some portion of a chip set, or some other combination of types of components. Interconnect 606 can be a serial interconnect, a parallel interconnect, or some other type of interconnect.

First component 602 can transmit information packets (such as command and/or data packets). First component 602 can also transmit idle packets, where at least one of the idle packets includes a test pattern or a portion of a test pattern. Interconnect 606 can receive the information packets, the idle packets and the test pattern from the first component 602. The second component 604 can receive the information packets, the idle packets and the test pattern from the interconnect 606 and can detect a condition (such as a failure condition) of the interconnect 606 in response to the test pattern.

In some embodiments the test pattern is a stress pattern designed to stress the interconnect 606 more than a stress on the interconnect 606 due to transmission of the information packets over the interconnect. In some embodiments portions of the test pattern can be included in a plurality of the idle packets. The test pattern can be distributed through several idle packets which are either continuous with each other, or can be distributed through several idle packets, at least some of which are not continuous with each other (for example, where some information packets are transmitted and/or received between various idle packets where a test pattern is sent in portions throughout those various idle packets).

In some embodiments the second component 604 can detect and count errors that occur in response to the test pattern, and can detect the condition when a number of such counted errors is greater than a predetermined number. In some embodiments the second component 604 can detect the condition by comparing the test pattern with a predetermined test pattern.

In some embodiments system 600 can include a spare interconnect 608 and first component 602 and/or second component 604 can include a controller 610 and/or a controller 612. In some embodiments either controller 610 and/or controller 612 together or separately can couple spare interconnect 608 to the first component 602 and/or to the second component 604 in response to the detected condition of the interconnect.

In some embodiments first component 602 and second component 604 can include similar circuitry, software, hardware, firmware or other devices that can perform the same functionality as each other. For example, each of the first and second components 602 and 604 may include their own controllers 610 and/or 612, transmitters 614 and/or 616, receivers 618 and/or 620 (and/or transceivers instead of separate transmitters and receivers), encoders, decoders, encoder/decoders 622 and/or 624, or other devices to implement different embodiments. Further, while FIG. 6 has been described above in a manner such that first component 602 transmits and second component 604 receives and detects, the functionality may be reversed. Additionally, in some embodiments each of first and second components 602 and 604 may both transmit and both receive and detect, for example. Thus, interconnect 606 and/or spare interconnect 608 may provide for transmission of packets in both directions between the components 602 and 604, or additional interconnect(s) may be used for transmission in one direction while interconnect 606 and spare interconnect 608 and/or other interconnects provide for transmission of packets in another direction.

FIG. 7 illustrates an example of a waveform 700 of a test pattern according to some embodiments. Waveform 700 illustrates some embodiments such as an embodiment related to an eight bit parallel bus. In some embodiments waveform 700 is a test stress pattern used to stress an interconnect. Waveform 700 illustrates a walking one pattern, for example, where at any one time (for example, clock pulse edge) all signals but two are switched. In some embodiments all signals but one could be switched at a time, for example. Waveform 700 illustrates an embodiment where eight signals (0-7) of an eight bit parallel bus are used. In some embodiments other numbers of signals may be used (for example, four signals 0-3). In the embodiment illustrated in FIG. 7 the clock can be used to rebuild the signal at the receiver based on signal edges. In some embodiments different test pattern signals may be used. For example, in some embodiments other types of clock signals may be used. In some embodiments a test pattern of signals may be used without any clock signal.

In each system, device, apparatus, method, etc. shown in a figure, the elements such as components, processors, switches, memory controllers, interconnects, I/O controllers, test pattern generators, drivers, leaky buckets, encoder/decoders, receivers, detectors and controllers, for example, in some cases each have a different reference number to suggest that the elements represented could be different, and in other cases have similar reference numbers. However, an element may be flexible enough to have different implementations and work with some or all of the systems shown or described herein. The various elements shown in the figures may be the same or different. Which one is referred to as a first element and which is called a second element is arbitrary.

An embodiment is an implementation or example of the inventions. Reference in the specification to "an embodiment," "one embodiment," "some embodiments," or "other embodiments" means that a particular feature, structure, or characteristic described in connection with the embodiments is included in at least some embodiments, but not necessarily all embodiments, of the inventions. The various appearances "an embodiment," "one embodiment," or "some embodiments" are not necessarily all referring to the same embodiments.

If the specification states a component, feature, structure, or characteristic "may", "might", or "could" be included, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

Although flow diagrams may have been used herein to describe embodiments, the inventions are not limited to those diagrams or to corresponding descriptions herein. For example, flow need not move through each illustrated box or exactly in the same order as illustrated and described herein.

The inventions are not restricted to the particular details listed herein. Indeed, those skilled in the art having the benefit of this disclosure will appreciate that many other variations from the foregoing description and drawings may be made within the scope of the present inventions. Accordingly, it is the following claims including any amendments thereto that define the scope of the inventions.

What is claimed is:

1. An apparatus comprising:
   a receiver to receive from an interconnect during a normal non-test operation of the interconnect information packets and idle packets, wherein at least one of the idle packets includes a test pattern, and wherein the idle packets had been transmitted over the interconnect only during the normal non-test operation of the interconnect when no information packets were pending for transmission over the interconnect; and
   a detector to detect a condition of the interconnect in response to the test pattern.

2. The apparatus as claimed in claim 1, wherein the test pattern is a stress pattern designed to stress the interconnect more than a stress on the interconnect due to transmission of the information packets over the interconnect.

3. The apparatus as claimed in claim 1, wherein the information packets include at least one of control packets and data packets.

4. The apparatus as claimed in claim 1, wherein portions of the test pattern are included in a plurality of the idle packets and wherein at least one of the information packets is to be received between at least two of the plurality of idle packets that include portions of the test pattern.

5. The apparatus as claimed in claim 1, wherein the idle packets are to be received when the information packets are not being received.

6. The apparatus as claimed in claim 1, wherein the condition of the interconnect is a failure condition of the interconnect.

7. The apparatus as claimed in claim 1, the detector to detect and count errors that occur in response to the test pattern and to detect the condition when a number of the errors is greater than a predetermined number.

8. The apparatus as claimed in claim 1, further comprising a controller to activate a spare interconnect in response to the condition.

9. A method comprising:
   receiving information packets from an interconnect dung a normal non-test operation of the interconnect;
   receiving idle packets from the interconnect during the normal non-test operation of the interconnect, wherein at least one of the idle packets includes a test pattern, and wherein the idle packets had been transmitted over the interconnect only during the normal non-test operation of the interconnect when no information packets were pending for transmission over the interconnect; and
   detecting a condition of the interconnect in response to the test pattern.

10. The method as claimed in claim 9, wherein the test pattern is a stress pattern designed to stress the interconnect more than a stress on the interconnect due to transmission of the information packets over the interconnect.

11. The method as claimed in claim 9, wherein portions of the test pattern are included in a plurality of the idle packets and wherein at least one of the information packets is received between at least two of the plurality of idle packets that include portions of the test pattern.

12. The method as claimed in claim 9, wherein the idle packets are received when the information packets are not being received.

13. The method as claimed in claim 9, wherein the condition of the interconnect is a failure condition of the interconnect.

14. The method as claimed in claim 9, wherein the detecting includes a detecting and counting of errors that occur in response to the test pattern and the condition is detected when the detecting and counting identifies a number of errors greater than a predetermined number.

15. The method as claimed in claim 9, further comprising activating a spare interconnect in response to the detected condition.

16. A method comprising:
   transmitting information packets to an interconnect during a normal non-test operation of the interconnect; and
   transmitting idle packets to the interconnect during the normal non-test operation of the interconnect, at least one of the idle packets including a test pattern, wherein the idle packets are transmitted to the interconnect only during the normal non-test operation of the interconnect when no information packets were pending for transmission over the interconnect.

17. The method as claimed in claim 16, wherein the test pattern is a stress pattern designed to stress the interconnect more than a stress on the interconnect due to the transmitting of the information packets over the interconnect.

18. The method as claimed in claim 16, wherein the information packets include at least one of control packets and data packets.

19. The method as claimed in claim 16, wherein portions of the test pattern are included in a plurality of the idle packets and wherein at least one of the information packets is transmitted between at least two of the plurality of idle packets that include portions of the test pattern.

20. The method as claimed in claim 16, wherein the idle packets are transmitted when the information packets are not being transmitted.

21. The method as claimed in claim 16, further comprising activating a spare interconnect in response to the test pattern.

22. A system comprising:
   a first component to transmit information packets and idle packets during a normal non-test operation, at least one of the idle packets including a test pattern, and wherein the idle packets are transmitted only during the normal non-test operation when no information packets are pending for transmission over the interconnect;
   an interconnect to receive the information packets, the idle packets and the test pattern from the first component during the normal non-test operation; and a second component to receive the information packets, the idle packets and the test pattern from the interconnect during the normal non-test operation, and to detect a condition of the interconnect in response to the test pattern.

23. The system as claimed in claim 22, wherein portions of the test pattern are included in a plurality of the idle packets and wherein at least one of the information packets is to be transmitted between at least two of the plurality of idle packets that include portions of the test pattern.

24. The system as claimed in claim 22, the second component to detect and count errors that occur in response to the test pattern, and to detect the condition when a number of errors is greater than a predetermined number.

25. The system as claimed in claim 22, further comprising:
- a spare interconnect; and
- a controller to couple the spare interconnect to the first component and to the second component in response to the condition of the interconnect.

* * * * *